(12) United States Patent
Jiang et al.

(10) Patent No.: US 8,968,911 B2
(45) Date of Patent: Mar. 3, 2015

(54) BATTERY ASSEMBLING DEVICE

(75) Inventors: Cheng-Shun Jiang, Taoyuan County (TW); Jia-Sing Hsu, Kaohsiung (TW)

(73) Assignee: Automotive Research & Testing Center, Changhua Hsien (TW)

(*) Notice: Subject to any disclaimer, the term of this patent is extended or adjusted under 35 U.S.C. 154(b) by 336 days.

(21) Appl. No.: 13/309,341

(22) Filed: Dec. 1, 2011

(65) Prior Publication Data
US 2013/0143102 A1 Jun. 6, 2013

(51) Int. Cl.
*H01M 6/42* (2006.01)
(52) U.S. Cl.
USPC .................................................. 429/159
(58) Field of Classification Search
None
See application file for complete search history.

(56) References Cited

U.S. PATENT DOCUMENTS

| | | | | |
|---|---|---|---|---|
| 5,667,908 | A * | 9/1997 | Stone | 429/96 |
| 2007/0132429 | A1 * | 6/2007 | Onuki et al. | 320/116 |
| 2009/0151137 | A1 * | 6/2009 | Darling, III | 24/568 |
| 2012/0077077 | A1 * | 3/2012 | Yoshitake et al. | 429/156 |
| 2012/0219846 | A1 * | 8/2012 | Chan | 429/159 |

* cited by examiner

*Primary Examiner* — Patrick Ryan
*Assistant Examiner* — Jose Colucci Rios
(74) *Attorney, Agent, or Firm* — Hershkovitz & Associates, PLLC; Abe Hershkovitz

(57) ABSTRACT

A battery assembling device has two brackets and an assembling unit. The brackets abut each other and can be securely mounted around two battery units. The assembling unit has a quick-release housing and two clamps. The quick-release housing has two electrode holes. The clamps are respectively mounted in the electrode holes and each clamp has two opposite threaded inner surfaces. The battery units can be bundled by the brackets in advance to form regular battery modules. Because the assembling unit is easily and quickly connected with the battery modules, the assembling of a cell of an electrical vehicle is greatly convenient and fast.

5 Claims, 13 Drawing Sheets

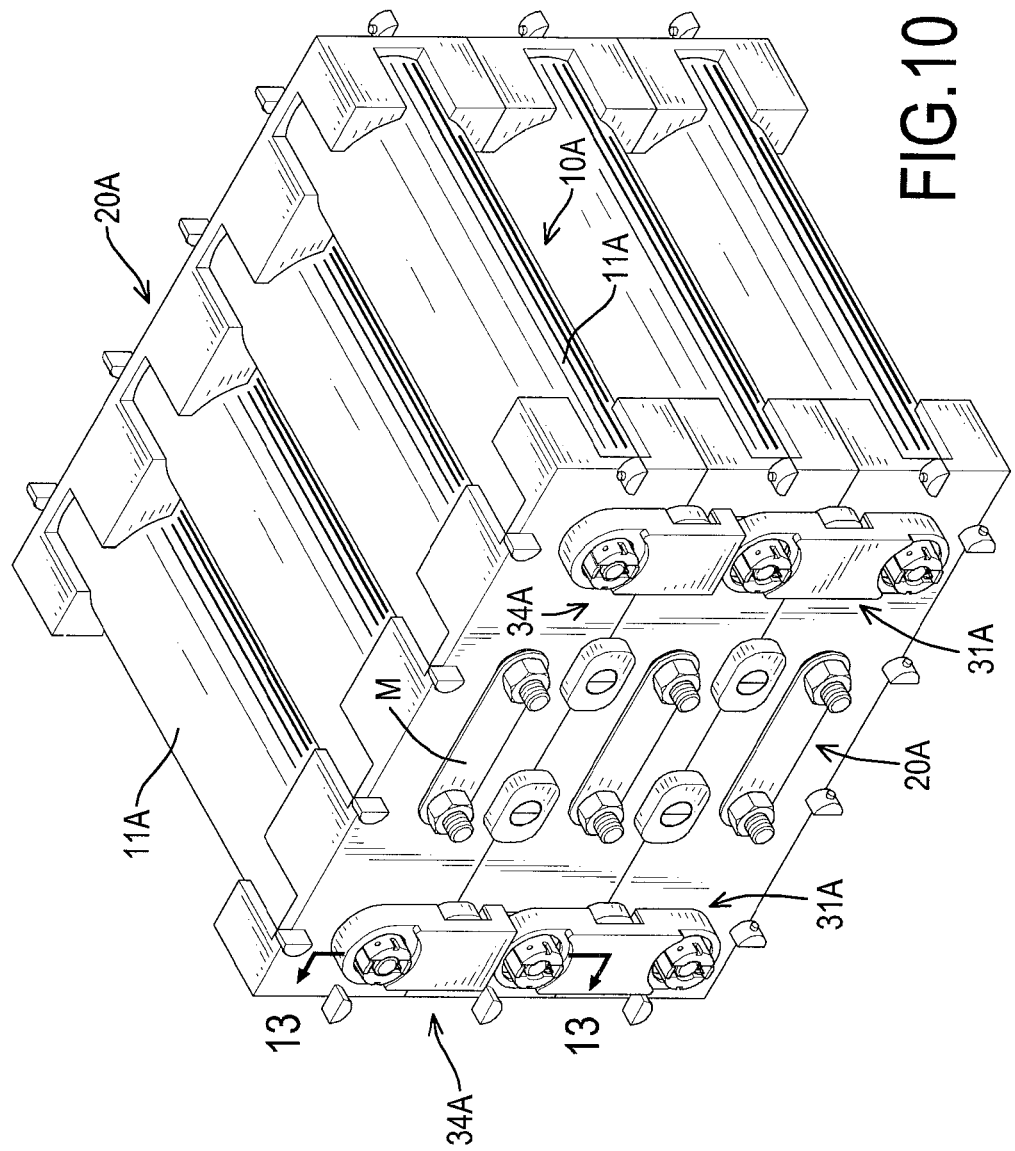

BATTERY ASSEMBLING DEVICE

BACKGROUND OF THE INVENTION

1. Field of the Invention

The present invention relates to a battery assembling device, and more particularly to a battery assembling device that can quickly and easily assemble batteries.

2. Description of Related Art

Two opposite sides of a battery for an electrical vehicle are respectively covered by two brackets to form a battery module. With reference to FIG. 14, each conventional bracket 90 has four edges, a bracket hole 91, multiple protrusions 92 and multiple recesses 93. The bracket hole 91 is formed through the bracket 90 and can be inserted by an electrode of a battery. The protrusions 92 and the recesses 93 of each bracket 90 are formed on the edges of the bracket 90 at intervals. Two of the protrusions 92 of each bracket 90 can be respectively mounted in two of the recesses 93 of the other bracket 90. Accordingly, two brackets 90 can be assembled and multiple battery modules can be connected securely to form a cell that is placed in an inner space of the electrical vehicle.

However, lots of battery modules are required in an electrical vehicle. Assembling the battery modules one by one is time-consuming. Moreover, the protrusions 92 of each bracket 90 have to be rotated in a specific direction to be connected with the recesses 93 of another bracket 90, but this is inconvenient and time-consuming.

To overcome the shortcomings, the present invention tends to provide a battery assembling device to mitigate the aforementioned problems.

SUMMARY OF THE INVENTION

The main objective of the invention is to provide a battery assembling device that can quickly and easily assemble batteries.

A battery assembling device has two brackets and an assembling unit. The brackets abut each other and can be securely mounted around two battery units. The assembling unit has a quick-release housing and two clamps. The quick-release housing has two electrode holes. The clamps are respectively mounted in the electrode holes and each clamp has two opposite threaded inner surfaces. The battery units can be bundled by the brackets in advance to form regular battery modules. Because the assembling unit is easily and quickly connected with the battery modules, the assembling of a cell of an electrical vehicle is greatly convenient and fast.

Other objects, advantages and novel features of the invention will become more apparent from the following detailed description when taken in conjunction with the accompanying drawings.

BRIEF DESCRIPTION OF THE DRAWINGS

FIG. 10 is a perspective front view of a second embodiment of the battery assembling device in accordance with the present invention, wherein the battery assembling device is assembled with multiple battery units to form an in-parallel cell;

DETAILED DESCRIPTION OF PREFERRED EMBODIMENT

Figure 1:
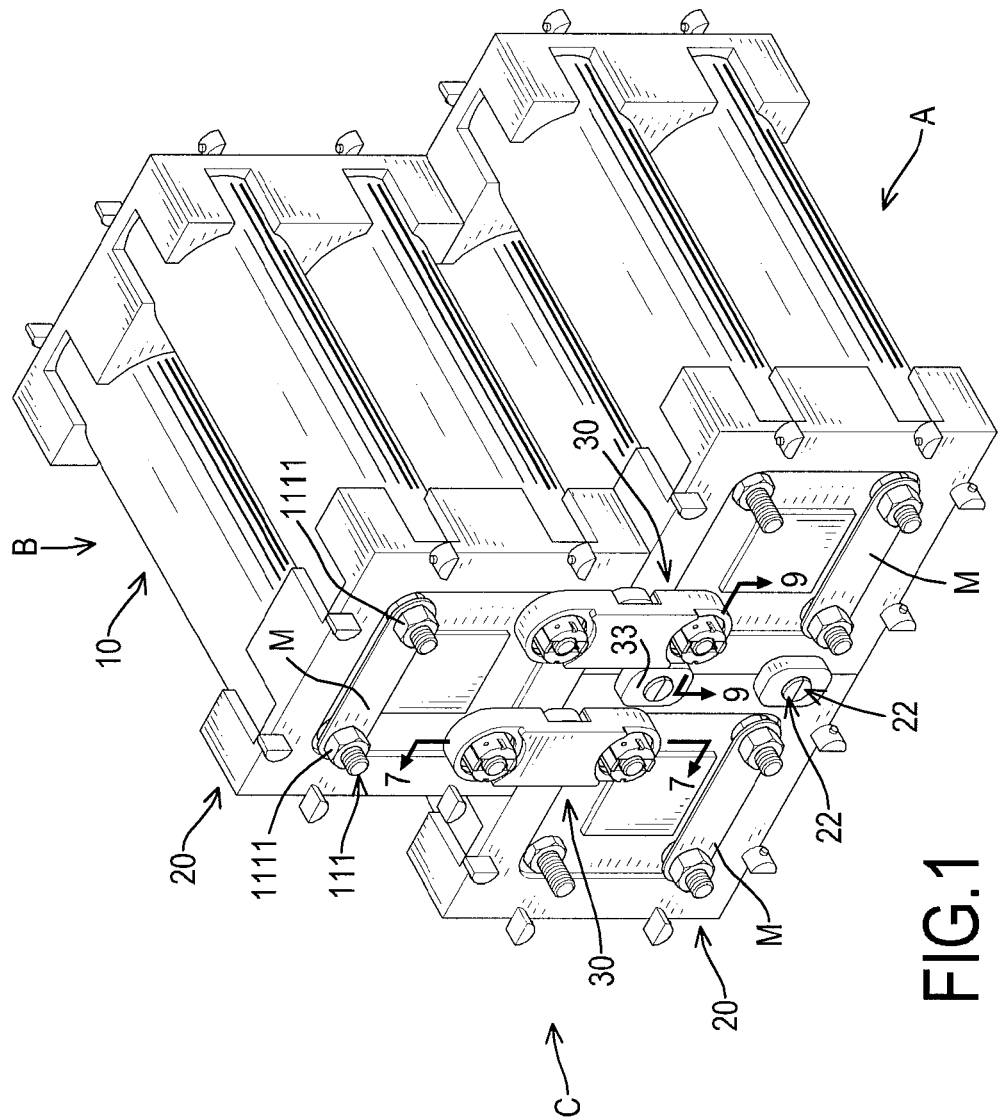
FIG. 1 is a perspective front view of a first embodiment of a battery assembling device in accordance with the present invention, wherein the battery assembling device is assembled with multiple battery units to form an in-series cell.
Figure 2:
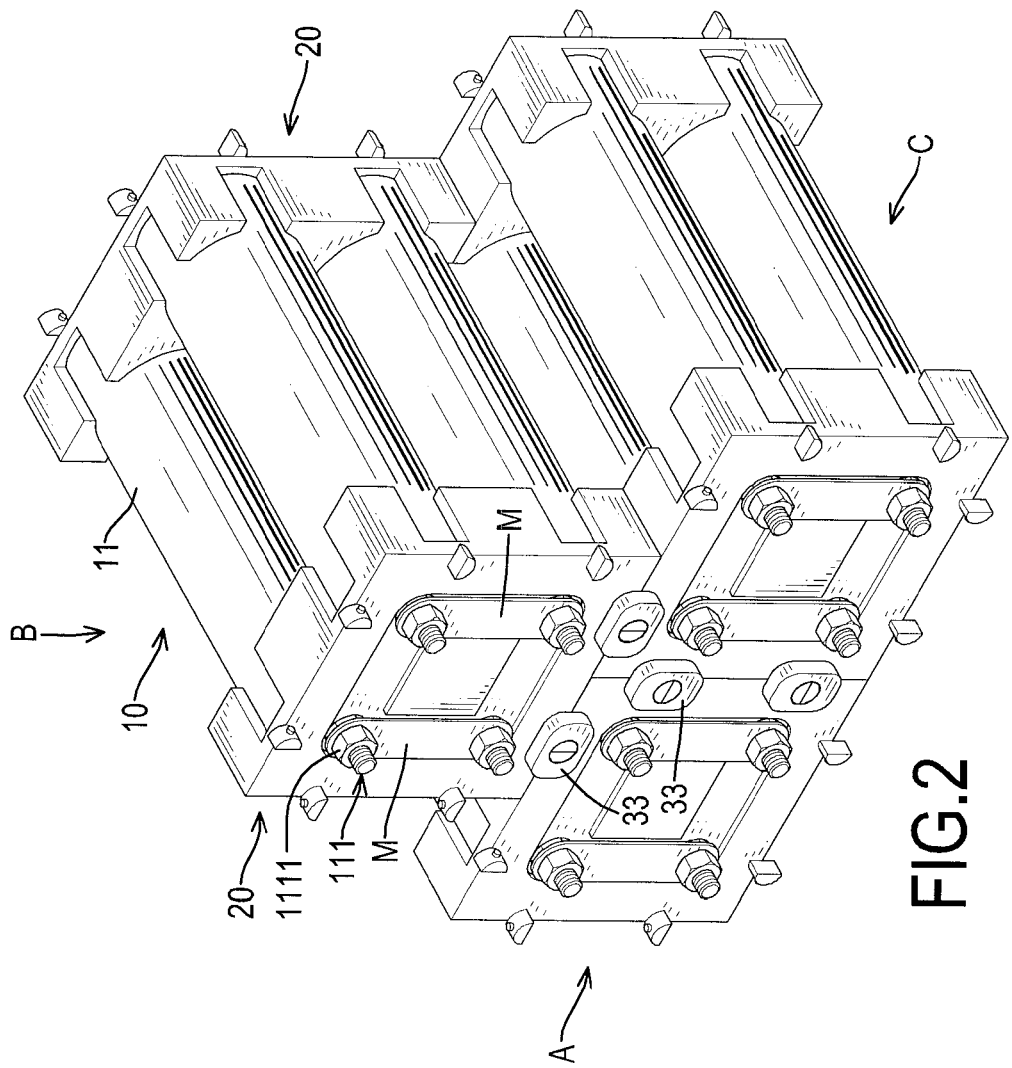
FIG. 2 is another perspective view of the in-series cell in FIG. 1.

With reference to FIGS. 1 and 2, a first embodiment of a battery assembling device in accordance with the present invention has at least two brackets 20 and at least one assembling unit 30 and is connected with multiple battery units 10 to form an in-series cell.

Preferably, the in-series cell has three battery modules and two assembling units 30. Each battery module has one battery unit 10, two brackets 20 and multiple metal sheets M.

Figure 7:
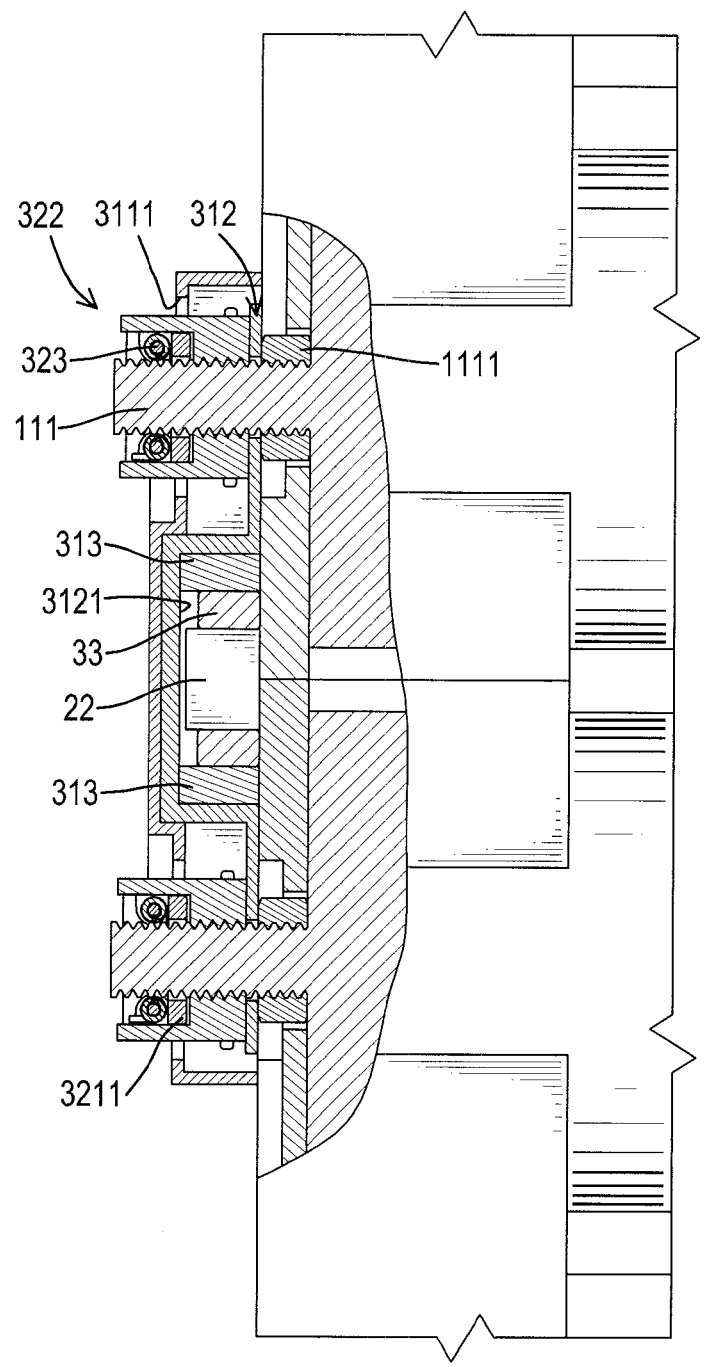
FIG. 7 is an enlarged side view in partial section of the in-series cell along line 7-7 in FIG. 1.

With further reference to FIG. 7, each battery unit 10 has multiple batteries 11 arranged as a matrix. Preferably, each battery unit 10 has four batteries 11. Each battery 11 has two opposite sides and two electrodes 111. The electrodes 111 of each battery 11 respectively protrude from the opposite sides of the battery 11 and each electrode 111 has a nut section 1111.

Number of the battery 11 of each battery unit 10 is variable, such as six or eight batteries 11. Moreover, each battery module can be assembled in advance for further assembling with the assembling units 30.

Figure 3:
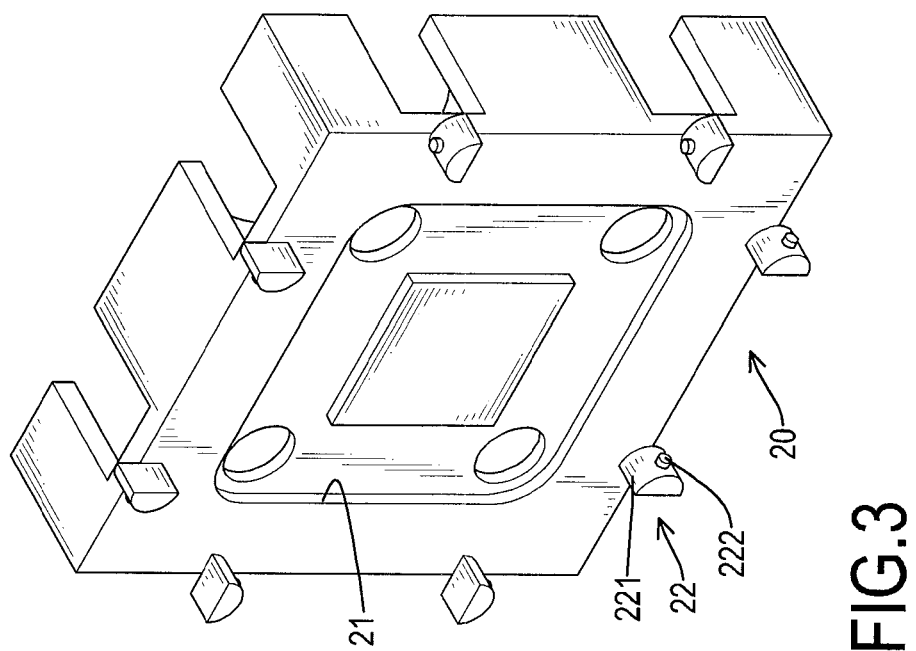
FIG. 3 is an enlarged perspective view of a bracket of the battery assembling device in FIG. 1.

With further reference to FIG. 3, the brackets 20 of each battery module are substantially square and respectively and securely mounted on the opposite sides of the battery unit 10 of the battery module. Three of the brackets 20 on one side of the in-series cell are flush with each other.

Each bracket 20 has an end surface, a central position, a bracket hole 21 and multiple positioning members 22. The bracket hole 21 of each bracket 20 is formed in the central position of the bracket 20.

The positioning members 22 of each bracket 20 protrude from the end surface of the bracket 20 at intervals. Preferably, each bracket 20 has eight positioning members 22.

Preferably, each positioning member 22 has a base 221 and a button 222. The base 221 of each positioning member 22 is semi-round in cross section and has a flat surface. The button 222 of each positioning member 22 is connected integrally with the base 221, and is opposite to the flat surface of the base 221 of the positioning member 22.

One of the brackets 20 of each battery module located at a front side of the in-series cell is defined as a front bracket 20.

The other of the brackets 20 of each battery module located at a rear side of the in-series cell is defined as a rear bracket 20.

With reference to FIGS. 1 and 2, preferably, three metal sheets M of each battery module are implemented. Each metal sheet M has two sheet holes formed through the metal sheet M and are mounted around two of the electrodes 111. One of the metal sheets M of each battery module is mounted in the bracket hole 21 of the front bracket 20 of the battery module, is inserted by the electrodes 111 of the battery module and electrically abuts the nut sections 1111 of the electrodes 111 of the battery module.

The other two of the metal sheets M of each battery module are mounted in the bracket hole 21 of the rear bracket 20 of the battery module, are inserted by the electrodes 111 of the battery module and electrically abut the nut sections 1111 of the electrodes 111 of the battery module.

With the metal sheets M electrically abutting the electrodes 111, the batteries 11 of each battery module can be connected in series.

The detailed description in the specification mainly focuses on the connection between the front brackets 20.

The battery module on a right side in FIG. 1 is defined as a first battery module A. The battery module on a top side in FIG. 1 is defined as a second battery module B. The battery module on a left side in FIG. 1 is defined as a third battery module C.

Two of the positioning members 22 of the front bracket 20 of the first battery module A respectively abut two of the positioning members 22 of the front bracket 20 of the second battery module B. The following description focuses on the two abutting positioning members 22 on the adjacent brackets 20. The bases 221 of the abutting positioning members 22 form a round cross section. The buttons 222 on the abutting positioning members 22 are diametrically opposite to each other.

The detailed description in the specification mainly focuses on connection between the first battery module A and the second battery module B.

Figure 4:
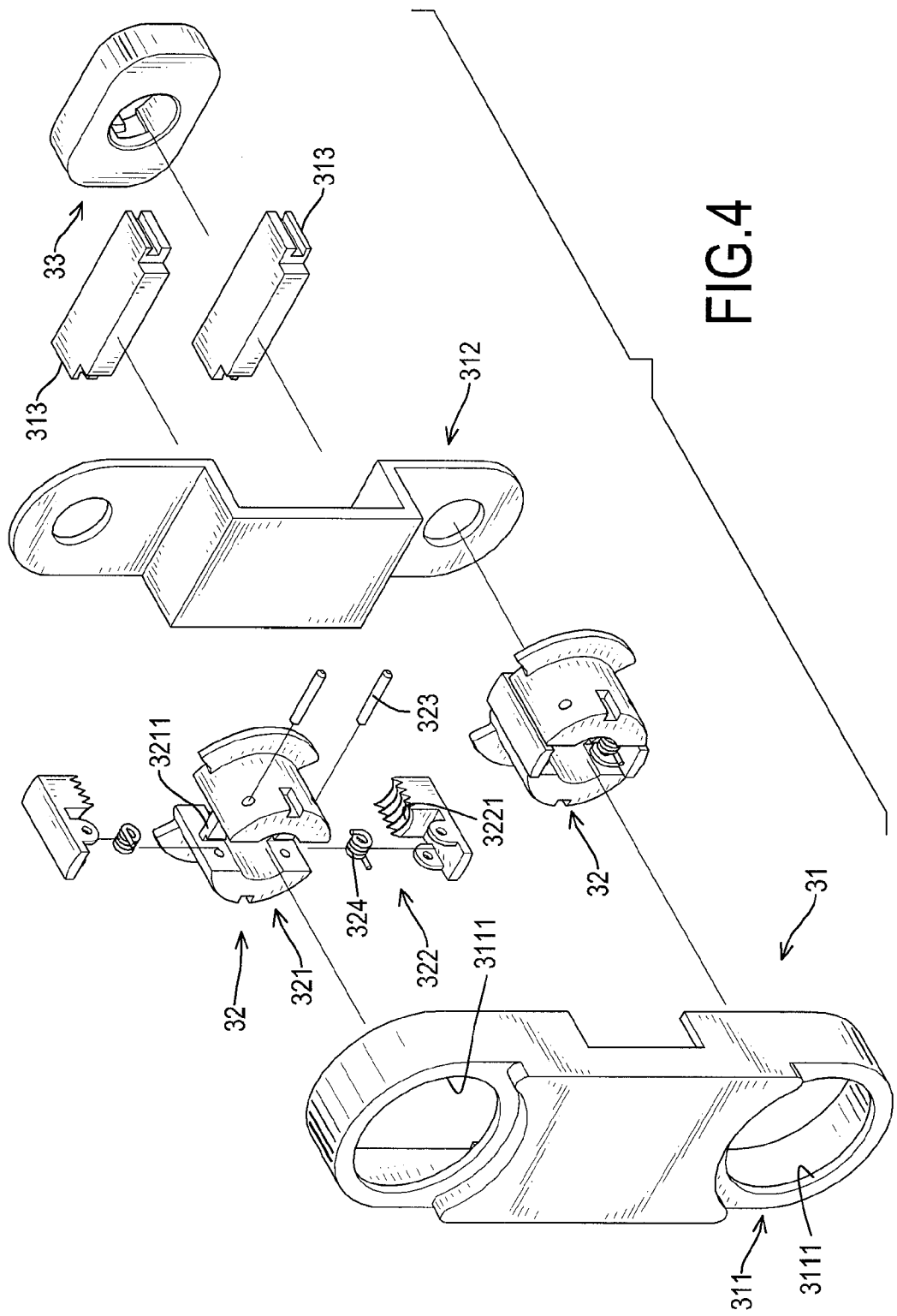
FIG. 4 is a partially exploded perspective view of an assembling unit of the battery assembling device in FIG. 1.
Figure 5:
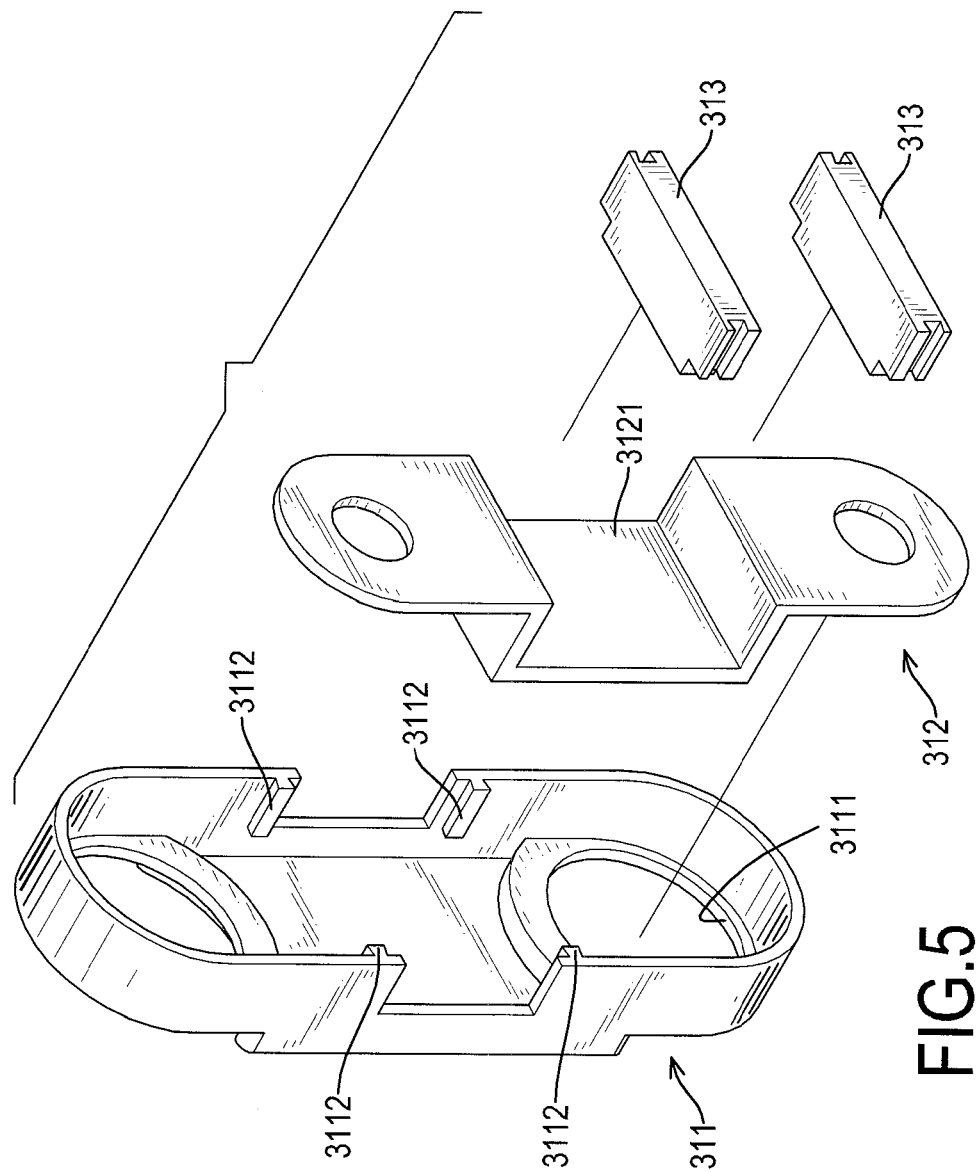
FIG. 5 is an enlarged exploded perspective view of a quick-release housing of the battery assembling device in FIG. 4.

With reference to FIGS. 1, 4 and 5, the assembling unit 30 connected securely with the first battery module A and the second battery module B has a quick-release housing 31, two clamps 32 and multiple member covers 33.

The quick-release housing 31 spans the first battery module A and the second module B and has a shell 311, a conductive plate 312 and two fixing members 313.

The shell 311 is insulating and has two opposite inner surfaces, two electrode holes 3111 and two rib units 3112. The electrode holes 3111 of the shell 311 are formed through the shell 311 and are respectively mounted around the adjacent two electrodes 111 of the first battery module A and the second battery module B. The rib units 3112 are formed on the inner surfaces of the shell 311 and each rib unit 3112 has two ribs respectively formed on the inner surfaces of the shell 311.

The conductive plate 312 is metallic, is mounted securely in the shell 311, is inserted by the adjacent two electrodes 111 of the first battery module A and the second module B and electrically abuts the nut sections 1111 of the adjacent two electrodes 111 of the first battery module A and the second module B. Accordingly, the first battery module A is electrically connected with the second battery module B by the conductive plate 312 of the assembling unit 30.

Preferably, the conductive plate 312 has a recess 3121 formed in the conductive plate 312, is located between the electrode holes 3111 and encompasses the two positioning members 22.

The fixing members 313 are mounted in the shell 311 of the quick-release housing 31, abut the conductive plate 312 of the quick-release housing 31 and are respectively connected with the rib units 3112. Each fixing member 313 has two opposite sides respectively connected with the ribs of a corresponding one of the rib units 3112. Accordingly, the conductive plate 312 is positioned securely in the shell 311 of the quick-release housing 31 by the fixing members 313.

Figure 6:
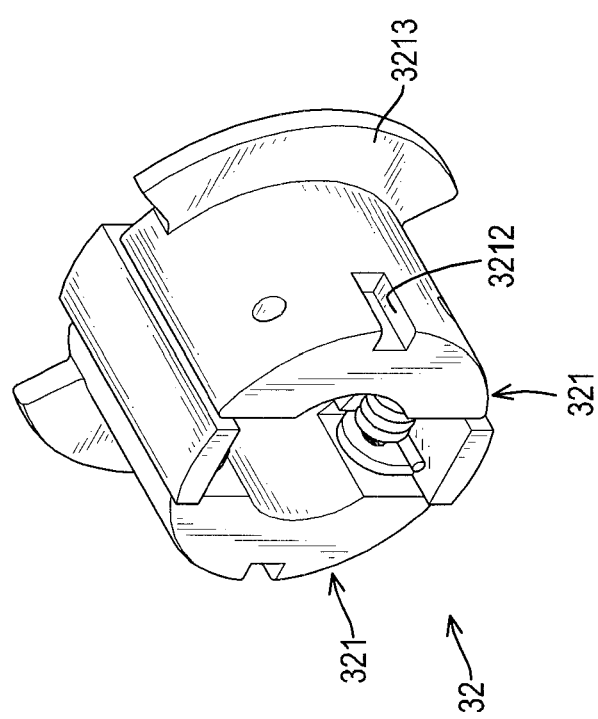
FIG. 6 is an enlarged perspective view of a clamp of the battery assembling device in FIG. 4.

With reference to FIGS. 4, 6 and 7, the clamps 32 are respectively mounted in the electrode holes 3111, press the conductive plate 312 and are securely and respectively mounted around the electrodes 111. Each clamp 32 has two clamping sections securely clamping the electrode 111. Each clamping section has an inner surface and a threaded surface formed on the inner surface of the clamping section. A radially maximal distance between the clamping sections of each clamp 32 is shorter than a diameter of each electrode hole 3111.

Preferably, each clamp 32 has two opposite sides, two chunks 321, two poles 322, two pins 323 and two torsion springs 324. Each chunk 321 has a connecting section 3211 connected securely with the other of the chunks 321. The poles 322 of each clamp 32 are respectively located at the opposite sides of the clamp 32, and each pole 322 is located between the chunks 32. In the embodiment, the poles 322 respectively serve as the clamping sections and inner surfaces 3221 of the poles 322 are the threaded surfaces.

The pins 323 of each clamp 32 are respectively mounted through the poles 322 of the clamp 32. Each pin 323 has two ends respectively mounted securely into the chunks 321 of the clamp 32.

The torsion springs 324 of each clamp 32 are respectively mounted around the pins 323. Each torsion spring 324 has a first end and a second end opposite to the first end of the torsion spring 324. The first end of each torsion spring 324 abuts an adjacent pole 322. The second end of each torsion spring 324 abuts an adjacent connecting section 3211.

Preferably, each clamp 32 has two tool grooves 3212, a first end surface and a second end surface opposite to the first end surface of the clamp 32. The first end surface of each clamp 32 abuts the conductive plate 312.

The tool grooves 3212 of each clamp 32 are respectively formed in the outer surfaces of the chunks 321 of the clamp 32, are respectively located at the opposite sides of the clamp 32, extend along lines parallel to an axis of the clamp 32 and are formed through the second end surface of the clamp 32.

A specific tweezers has two clips connected pivotally with each other and respectively having a tweezer rib. The tweezer ribs can be respectively inserted into the tool grooves 3212. Consequently, the tool grooves 3212 allow the clamps 32 to be rotated by the tweezers.

Preferably, each clamp 32 has two wings 3213 protruding respectively from the outer surfaces of the chunks 321, respectively located at the opposite sides of the clamp 32 and located in the quick-release housing 31.

Figure 9:
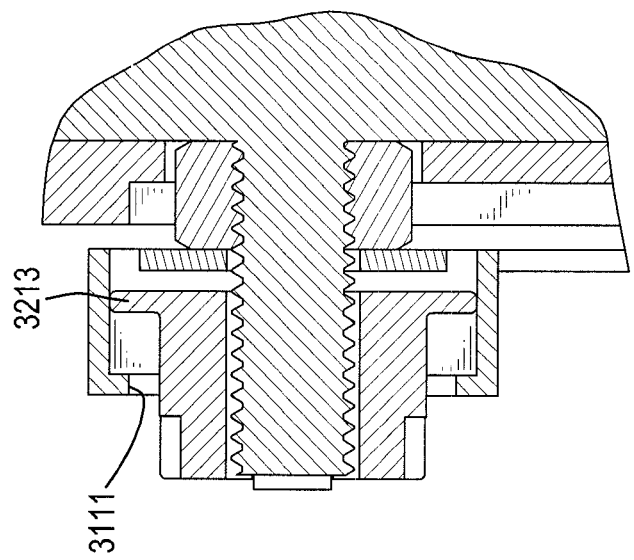
FIG. 9 is an enlarged side view in partial section of the in-series cell along line 9-9 in FIG. 1.
Figure 8:
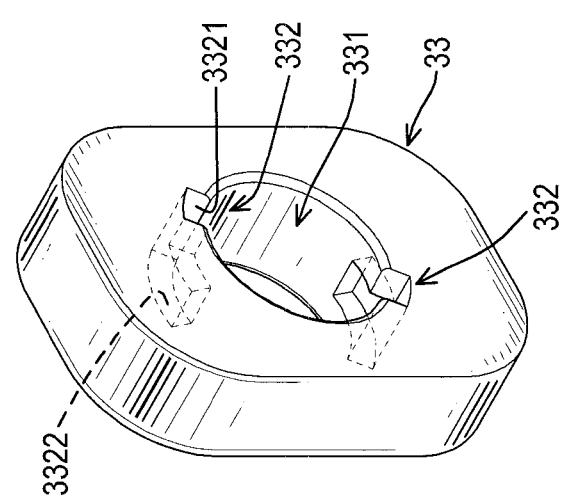
FIG. 8 is an enlarged perspective view of a member cover of the battery assembling device in FIG. 4.

With reference to FIG. 9, preferably, a radially maximal distance between the wings 3213 of each clamp 32 is longer than the diameter of each electrode hole 3111. Therefore, the clamps 32 can be prevented from escaping from the electrode holes 3111.

The following description describes a connection between the adjacent two positioning members 22 of the first battery module A and the second battery module B and one of the member covers 33.

With reference to FIGS. 1, 4, 7 and 8, the member cover 33 is securely mounted around the adjacent two positioning members 22. Preferably, the member cover 33 has a through hole 331 and two trenches 332. The through hole 331 of the member cover 33 is formed through the member cover 33, is mounted around the bases 221 of the first battery module A and the second battery module B and has an inner surface.

The trenches 332 of the member cover 33 are formed in the inner surface of the through hole 331 of the member cover 33 and are respectively connected with the buttons 222. Each trench 332 has a trench opening 3321 and a sliding groove 3322. A width of the trench opening 3321 of each trench 332 is larger than that of each button 222. The sliding groove 3322 of each trench 332 has two opposite ends. One of the ends of the sliding groove 3322 of each trench 332 communicates with the trenching opening 3321 and the other of the ends of the sliding groove 332 receives the button 222.

Each assembling unit 30 has to be assembled in advance. Take one assembling unit 30 for example. The clamps 32 are placed in the shell 311 of the quick-release housing 31 and respectively protrude out from the electrode holes 3111 of the quick-release housing 31. Then, the conductive plate 312 is placed in the shell 311 to limit the clamps 32. The fixing members 313 are respectively connected with the rib units 3112 and abut the conductive plate 312 to keep the conductive plate 312 in position. Because the conductive plate 312 and the wings 3213 limit the clamps 32, the clamps 32 are kept from escaping from the shell 311.

The first battery module A, the second battery module B and the third battery module C are gathered abreast to make the adjacent two positioning members 22 abut with each other. Each member cover 33 is then mounted around the abutting positioning members 22 and is rotated to make the buttons 222 of the abutted positioning members 22 slide into the trenches 332 for secure positioning.

Finally, a tweezers or a hand presses the clamp 32 to make the poles 322 of the clamp 32 pivot. Therefore, the clamp 32 can clamp and be connected with the electrode 111 quickly by the inner surfaces 3221 of the poles 322. Because the length between the clamping sections (the poles 322) of each clamp 32 is shorter than the diameter of each electrode hole 3111, there is a space for the poles 322 to pivot. The tweezers or the hand rotates the clamp 32 and the clamp 32 moves toward the conductive plate 312 of the quick-release housing 31 along threads of the electrode 111. The clamp 32 abuts and moves the conductive plate 312 until the conductive plate 312 abuts the nut section 1111 of the electrode 111. Accordingly, the first battery module A is electrically connected with the second battery module B.

With the arrangement of the assembling units 30, the battery modules A, B, C can be connected in series.

Figure 11:
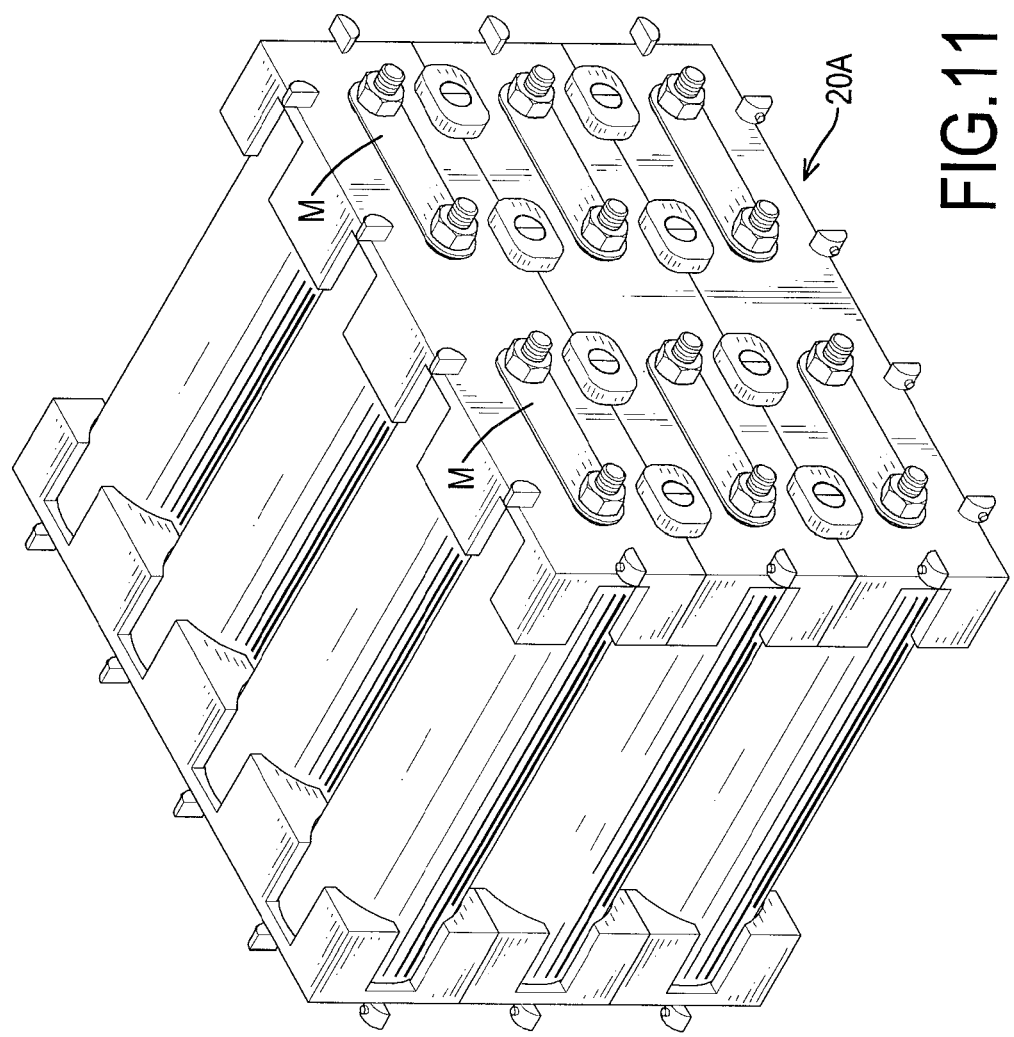
FIG. 11 is a perspective rear view of the in-parallel cell in FIG. 10.

With reference to FIGS. 10 and 11, a second embodiment of a battery assembling device in accordance with the present invention is connected with multiple battery units 10A to form an in-parallel cell. The structure of the second embodiment is substantially the same as that of the first embodiment. Two assembling units 30A and six brackets 20A are implemented. Each assembling unit 30A of the second embodiment further has a parallel connecting housing 34A.

Each bracket 20A is mounted securely on one side of a corresponding battery unit 10A. Each battery unit 10A has four batteries 11A. Similarly, with the metal sheets M electrically abutting the electrodes 111A, the batteries 11A of each battery module can be connected in series. However, the assembling units 30A of the second embodiment make the battery modules connected in parallel.

Figure 12:
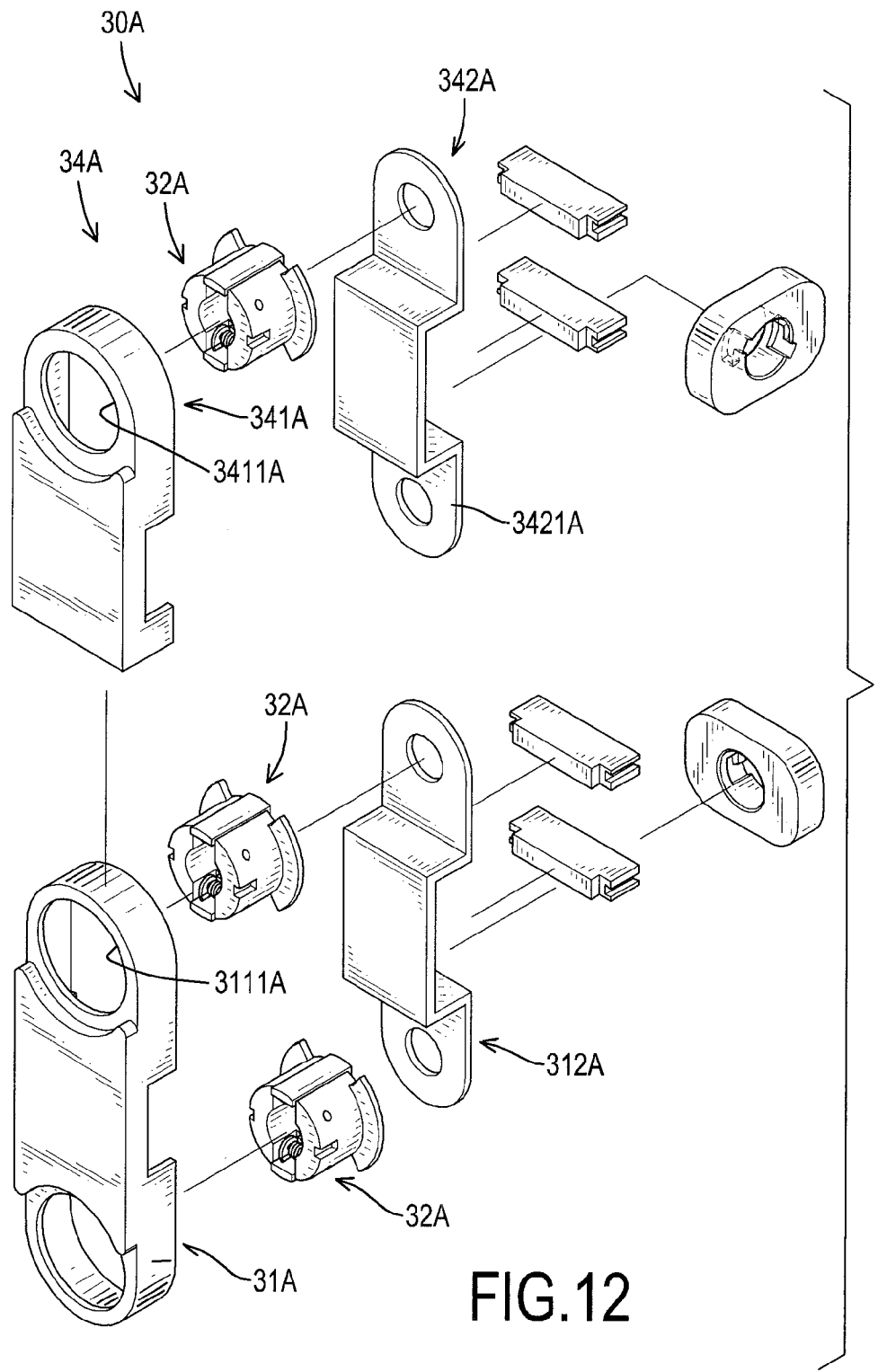
FIG. 12 is a partially exploded perspective view of an assembling unit of the battery assembling device in FIG. 10.
Figure 13:
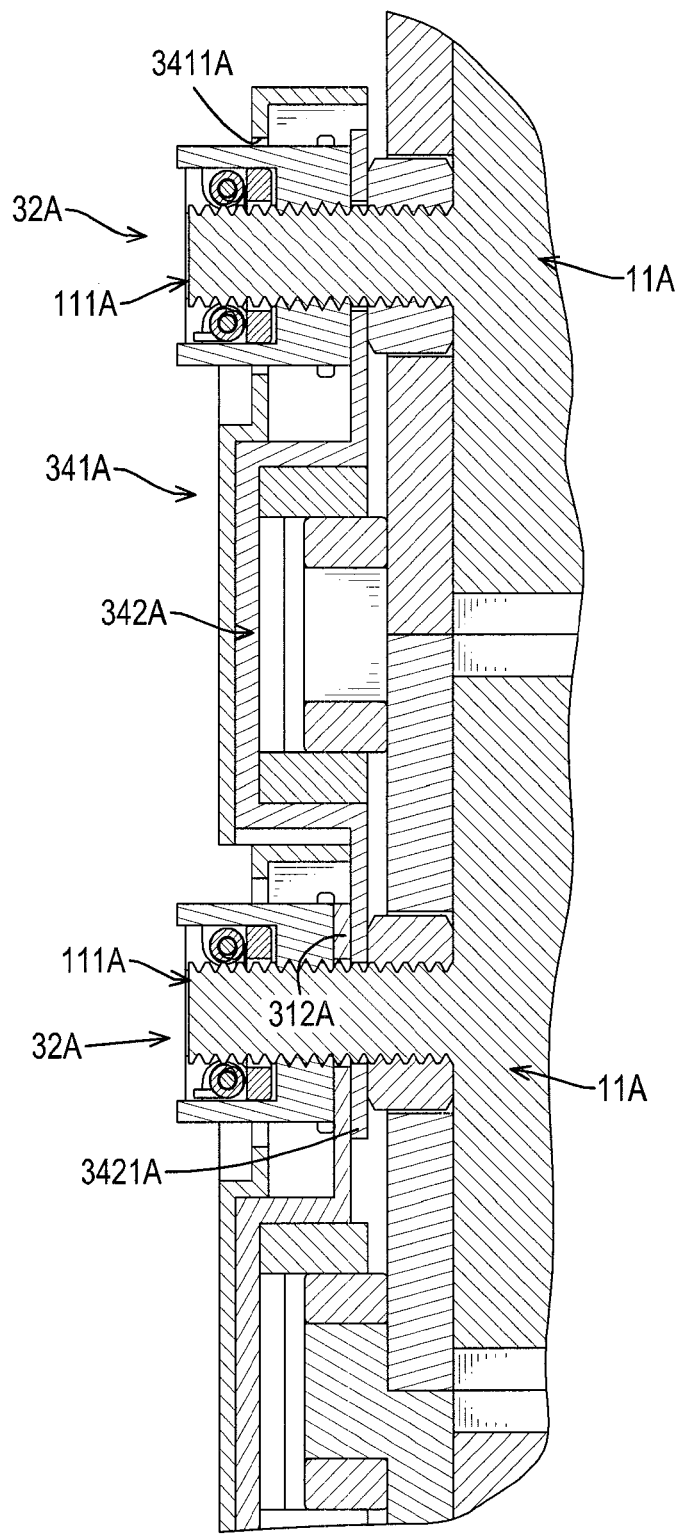
FIG. 13 is an enlarged side view in partial section of the in-parallel cell along line 13-13 in FIG. 10.
Figure 14:
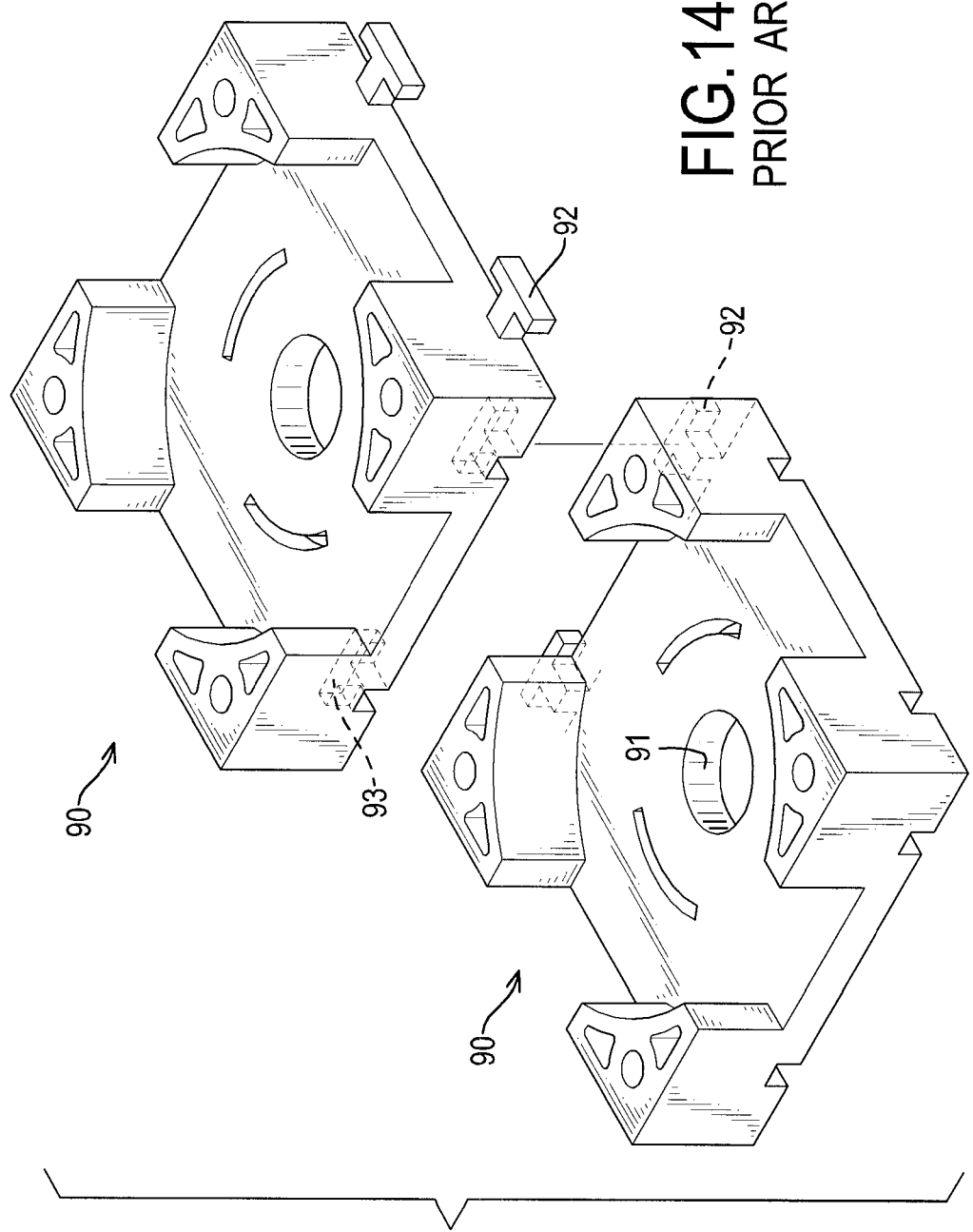
FIG. 14 is an exploded perspective view of two conventional brackets in accordance with the prior art.

Take one assembling unit 30A for example, with reference to FIGS. 10 to 12, the parallel connecting housing 34A spans the upper two battery modules and has a shell 341A and a conductive plate 342A.

The shell 341A of the parallel connecting housing 34A has an electrode hole 3411A formed through the shell 341A of the parallel connecting housing 34A.

The conductive plate 342A is mounted securely in the shell 341A of the parallel connecting housing 34A and has a protrusion 3421A. The protrusion 3421A of the parallel connecting housing 34A protrudes out from the shell 341A of the parallel connecting housing 34A, is mounted around the electrode 111A of the battery module located at a middle position of the in-parallel cell and is electrically pressed by the conductive plate 312A of the quick-release housing 31A. Accordingly, the parallel connecting housing 34A is electrically connected with the quick-release housing 31A.

The electrode hole 3411A of the parallel connecting housing 34A is substantially the same as that of the quick-release housing 31A. A clamp 32A is mounted in the electrode hole 3411A of the parallel connecting housing 34A and clamps the electrode 111A.

The assembling of the second embodiment is substantially the same as that of the first embodiment. The clamps 32A abut the conductive plates 342A of the parallel connecting housing 34A or the conductive plates 312A of the quick-release housing 31A.

From the above description, it is noted that the present invention has the following advantages:

1. Easy and Quick Assembling and Disassembling:

The battery units 10,10A are bundled by the brackets 20,20A and the metal sheets M in advance to form the regular battery modules A, B, C. Because the assembling units 30,30A are easily and quickly connected with the battery modules. the assembling and disassembling of a cell of an electrical vehicle are greatly convenient and fast.

2. Excellent Assembling Versatility:

Inner spaces of electrical vehicles for cells have different sizes and need different numbers of batteries. The regular battery modules have some regular sizes and can be quickly connected with the assembling units 30,30A to form different numbers or formats of cells. This is more convenient and versatile than assembling the conventional batteries one by one.

3. No Assembling Directivity:

The brackets 20,20A are flush with each other to make the positioning members 22 of the brackets 20 abut, and then the member covers 33 are mounted around the positioning members 22. Accordingly, the assembling of the brackets 20,20A is not directional and is fast and convenient.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery assembling device capable of being connected with two battery units that respectively have a side and an electrode formed on the side of the battery unit, the battery assembling device comprising:

two brackets abutting each other and capable of being securely and respectively mounted on the sides of the two battery units; and an assembling unit connected securely with the two brackets and having a quick-release housing spanning the brackets and having an insulating shell having two electrode holes that are formed through the shell and are capable of being respectively mounted around the electrodes of the two battery units; and a metallic conductive plate mounted securely on the shell and capable of being inserted by and electrically abutting the electrodes of the two battery units; and two clamps respectively mounted in the electrode holes, pressing the conductive plate and capable of being securely and respectively mounted around the electrodes of the two battery units, each clamp having two clamping sections capable of securely clamping a corresponding one of the electrodes of the two battery units, and each clamping section having an inner surface; and a threaded surface formed on the inner surface of the clamping section and abutting the corresponding electrode, wherein a radially maximal distance between the clamping sections of each clamp is shorter than a diameter of each electrode hole, wherein each clamp has two opposite sides;

two chunks, each chunk having a connecting section connected securely with the other of the chunks;

two poles respectively located at the opposite sides of the clamp and respectively serving as the clamping sections, each pole located between the chunks;

two pins respectively mounted through the poles, each pin having two ends respectively mounted securely into the chunks of the clamp; and two torsion springs respectively mounted around the pins and respectively abutting the connecting sections, each torsion spring having a first end abutting an adjacent pole; and a second end opposite to the first end of the torsion spring and abutting a corresponding one of the connecting sections, wherein each clamp has a first end surface abutting the conductive plate;

a second end surface opposite to the first end surface of the clamp; and two tool grooves respectively formed in outer surfaces of the chunks of the clamp, respectively located at the opposite sides of the clamp, extending along lines parallel to an axis of the clamp and formed through the second end surface of the clamp.

2. The battery assembling device as claimed in claim 1, wherein the assembling unit further has a parallel connecting housing having an insulating shell having an electrode hole formed through the shell of the parallel connecting housing; and a metallic conductive plate mounted securely in the shell of the parallel connecting housing and having a protrusion protruding out from the shell of the parallel connecting housing, electrically abutting the conductive plate of the quick-release housing and capable of being mounted around one of the electrodes of the two battery units; and each clamp has two wings protruding respectively from the outer surfaces of the chunks, respectively located at the opposite sides of clamp and located in the quick-release housing.

3. The battery assembling device as claimed in claim 2, wherein the conductive plate of the quick-release housing has a recess formed in the conductive plate and located between the electrode holes of the quick-release housing;

each bracket has an end surface;

a positioning member protruding from the end surface of the bracket and located in the recess, wherein the positioning member of each bracket abuts the positioning member of the other of the brackets; and the assembling unit has a member cover securely mounted around the positioning members of the two brackets.

4. The battery assembling device as claimed in claim 3, wherein the positioning member of each bracket has a semi-round base having a flat surface, wherein the base of each bracket abuts the base of the other of the brackets to form a round cross section; and a button connected integrally with the base of the positioning member and opposite to the flat surface of the base of the positioning member;

the member cover has a through hole formed through the member cover, mounted around the bases of the two brackets and having an inner surface;

two trenches formed in the inner surface of the through hole of the member cover and respectively connected with the buttons of the two brackets, each trench having a trench opening having a width larger than a width of each button; and a sliding groove having two opposite ends, wherein one of the ends of the sliding groove communicates with the trenching opening and the other of the ends of the sliding groove receives the button.

5. The battery assembling device as claimed in claim 4, wherein the shell of the quick-release housing has two opposite inner surfaces; and two rib units formed on the inner surfaces of the shell of the quick-release housing, each rib units having two ribs respectively formed on the inner surfaces of the shell of the quick-release housing;

the quick-release housing has two fixing members mounted in the shell of the quick-release housing, abutting the conductive plate of the quick-release housing and respectively connected with the rib units of the shell of the quick-release housing, each fixing member having two opposite sides respectively connected with the ribs of a corresponding one of the rib units.

* * * * *